United States Patent [19]

Chang

[11] Patent Number: 5,072,314
[45] Date of Patent: Dec. 10, 1991

[54] IMAGE ENHANCEMENT TECHNIQUES USING SELECTIVE AMPLIFICATION OF SPATIAL FREQUENCY COMPONENTS

[75] Inventor: Tallis Y. Chang, Woodland Hills, Calif.

[73] Assignee: Rockwell International Corporation, El Segundo, Calif.

[21] Appl. No.: 504,519

[22] Filed: Apr. 4, 1990

[51] Int. Cl.⁵ .............................. G02B 27/46
[52] U.S. Cl. ..................... 359/559; 359/558; 359/495; 382/42
[58] Field of Search ............. 350/3.64, 162.11, 162.12, 350/162.13, 162.14, 401; 364/822, 825; 382/31, 42

[56] References Cited

U.S. PATENT DOCUMENTS

| | | | |
|---|---|---|---|
| H331 | 9/1987 | Gregory | 382/31 |
| 3,700,902 | 10/1972 | Buchan | 250/201 |
| 3,744,879 | 7/1973 | Beard . | |
| 3,969,017 | 7/1976 | Dammann | 350/162.12 |
| 4,118,107 | 10/1978 | Parrent . | |
| 4,370,024 | 1/1983 | Task . | |
| 4,453,804 | 6/1984 | Evans | 350/162.12 |
| 4,558,925 | 12/1985 | Casseday | 350/358 |
| 4,566,757 | 1/1986 | Fusek . | |
| 4,576,434 | 3/1986 | Huignard et al. | 350/162.12 |
| 4,674,824 | 6/1987 | Goodman et al. | 350/3.64 |
| 4,701,879 | 6/1987 | Scarr | 365/49 |
| 4,703,992 | 11/1987 | Yeh | 350/3.64 |
| 4,750,153 | 6/1988 | Owechko et al. | 350/3.6 |
| 4,877,297 | 10/1989 | Yeh . | |
| 4,958,376 | 9/1990 | Leib | 350/162.12 |

OTHER PUBLICATIONS

Goodman, Introduction to Fourier Optics, pp. 141-147 (McGraw-Hill 1968).
Hecht, et al., Optics, pp. 467-473 (Addison-Wesley 1974).

*Primary Examiner*—Bruce Y. Arnold
*Assistant Examiner*—J. P. Ryan
*Attorney, Agent, or Firm*—John J. Deinken

[57] ABSTRACT

An optical image enhancer includes a beam of coherent light for carrying an input image and a first lens for receiving the beam and performing a spatial Fourier transform of the input image. A photorefractive crystal at the Fourier plane receives the transformed image, while a coherent pump beam illuminates selected spatial frequency components of the transformed image at the Fourier plane, thereby transferring energy to the selected frequencies by two-beam coupling. A second lens receives the transformed image from the Fourier plane and performs a spatial Fourier transform of the transformed image, thereby reproducing the input image in an output image which contains intensified features corresponding to the selected spatial frequency components. A spatial light modulator may be used to cause the pump beam to illuminate the selected spatial frequency components of the transformed image at the Fourier plane. The pump beam can carry the Fourier transform of a selected portion of the input image, such that the intensity of the selected portion is increased in the output image.

22 Claims, 6 Drawing Sheets

IMAGE ENHANCEMENT TECHNIQUES USING SELECTIVE AMPLIFICATION OF SPATIAL FREQUENCY COMPONENTS

BACKGROUND OF THE INVENTION

This invention is concerned with enhancing the features of an optical image.

The enhancement of image features by filtering out appropriate spatial frequency components, which is known as spatial filtering, has been demonstrated to be a powerful tool for various image processing applications over the years. The technique consists of performing a spatial Fourier transformation of an incident image using a spherical lens, aligning an appropriate spatial filter at the Fourier plane, then performing an inverse Fourier transformation of the beam emerging from the filter. The Fourier transform of the Fourier transform of the image, as modified by the filtering operation, enhances certain features of the original image, as determined by the filter. A number of the disadvantages of this technique are associated with the fact that spatial frequency components are removed. First, the overall intensity of the processed image is weaker, since some of the components of the image are removed. Second, after one stage of such spatial filtering, further processing of the same image to enhance different features is often not possible, since the spatial frequency components required for the second stage enhancement may be removed in the first stage. Third, the processed image will contain only the features selected by the filter and will exclude the remainder of the information from the original image, which can impose difficulty in deciphering information from the processed image. For these reasons, spatial filtering has some serious limitations which make the prior art approaches to this technique undesirable for many applications.

A special subset of image enhancement, edge enhancement, is an important technique for image recognition. Image recognition techniques such as correlation and convolution require low cross-talk between images for high signal-to-noise results. To reduce the image cross-talk between a reference image and the background, the test image should first be edge enhanced. Edge enhancement in the optical domain can be a relatively simple and instantaneous process, requiring only a lens to Fourier transform an image and a small filter to block out the DC component of the spatial frequency components. For most images, however, much of the energy in the image resides in the DC component, so that blocking out this component causes the loss of a significant fraction of the energy present in the original image.

SUMMARY OF THE INVENTION

This invention makes possible the optical enhancement of an image by spatial Fourier transformation without significantly degrading the intensity of the enhanced image. An optical image enhancer constructed according to this invention includes a beam of coherent light for carrying an input image and a first lens for receiving the beam and performing a spatial Fourier transform of the input image. A photorefractive crystal at the Fourier plane receives the transformed image, while a coherent pump beam illuminates selected spatial frequency components of the transformed image at the Fourier plane, thereby transferring energy to the selected frequencies by two-beam coupling. Finally, a second lens receives the transformed image from the Fourier plane and performs a spatial Fourier transform of the transformed image, thereby reproducing the input image in an output image which contains intensified features corresponding to the selected spatial frequency components.

The illuminated spatial frequency components can be selected to increase the intensity of any portion of the output image such as, for example, horizontal edges, vertical edges, or diagonal edges.

In addition, a spatial light modulator may be used to cause the pump beam to illuminate the selected spatial frequency components of the transformed image at the Fourier plane.

Furthermore, the pump beam can carry the Fourier transform of a selected portion of the input image, such that the intensity of the selected portion is increased in the output image.

In another embodiment, the enhancer also includes an optical element between the first lens and the photorefractive crystal for separating the DC component of the transformed image from the remainder of the transformed image, such that the DC component of the transformed image is directed at the photorefractive crystal to act as the coherent beam and transfer energy to the higher order Fourier components of the transformed image.

The optical element may be a combination of a birefringent plate and a polarizing beamsplitter, a prism, or an optical fiber.

DESCRIPTION OF THE INVENTION

It is an outstanding feature of this invention to provide a new image processing technique. Like spatial filtering, the inventive technique of spatial amplification manipulates spatial frequency components at the Fourier plane of an image. Unlike spatial filtering, however, where the unwanted frequencies are simply eliminated, in spatial amplification the desired frequencies are coherently amplified. The resulting output image will thus not only contain enhanced features, but will also retain as well all of the information which was present in the input image. Preserving the original image in addition to enhancing particular features can be extremely useful if the enhanced features must be viewed in comparison to unenhanced features. Moreover, because nothing is removed from the original image in spatial amplification, additional stages of processing can be cascaded serially using the processed image from each stage as the input to the next stage. Furthermore, this amplification technique is well suited for processing low intensity input images since the light is amplified rather than filtered.

Figure 1:
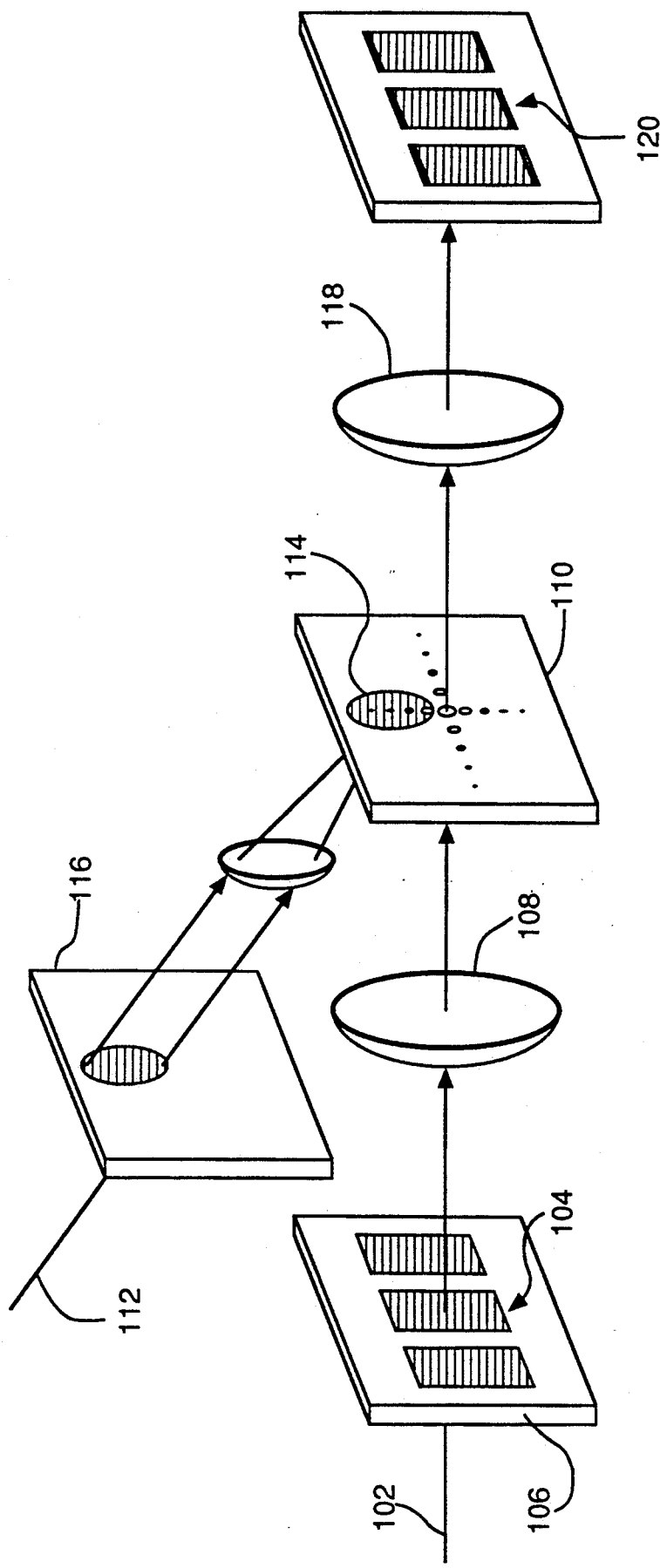
FIG. 1 is a schematic diagram illustrating in a perspective view one embodiment of an optical image enhancer constructed according to the present invention.

FIG. 1 is a schematic diagram illustrating in a perspective view one embodiment of an optical image enhancer constructed according to the present invention. In this image enhancer, an input or probe beam of coherent light, whose beam path is indicated by the line 102, carries an input image 104, which is imposed on the beam by an element 106 interposed in the beam path, which could be, for example, a transparency or a spatial light modulator. A first spherical lens 108 is positioned to perform a spatial Fourier transform of the input image 104. A photorefractive crystal 110, such as, for example, a barium titanate crystal having its c axis appropriately oriented with respect to the beam paths 102 and 112, is located at the Fourier plane for receiving the transformed image from the lens 108. As will be appreciated by those skilled in the art, the probe and pump beams must also be properly polarized for the crystal 110. A coherent pump beam, which is directed along the beam path 112, illuminates selected spatial frequency components, as indicated by the area 114, of the transformed image at the Fourier plane. One way in which the selected frequencies may be chosen is by means of a spatial light modulator 116 operating on the pump beam, whose pattern is imaged onto the crystal 110 by an imaging lens 113.

Since photorefractive two-beam coupling will occur in the photorefractive crystal wherever the pump beam intersects the input probe beam, only the selected frequency components illuminated by the pump beam will gain energy. After the enhanced beam exits the crystal 110, a second lens 118 receives the beam and performs a spatial Fourier transform of the transformed image. The resulting output image 120 will include the original image as well a the enhanced features. In the specific example illustrated in FIG. 1, illumination of the area 114 by the pump beam causes the enhancement of the horizontal edges in the output image, which is shown in the image 120 by means of thickened horizontal lines.

The two-beam coupling process utilized in this invention involves the use of nonlinear optical media for the coupling of two electromagnetic waves, including the exchange of energy between the waves. Two-beam coupling is a physical process which takes advantage of the nonlinear response of some materials to the illumination of electromagnetic radiation. Consider, for example, the interference pattern formed by two laser beams in a nonlinear medium. Such a pattern is characterized by a spatial variation (which is usually periodic) of the intensity. If the medium responds nonlinearly, then a variation of the refractive index will be induced in the medium. The process of forming an index variation pattern inside the nonlinear medium using two-beam interference is similar to that of hologram formation and may be considered as a real time holographic phenomenon in which the recording and readout functions occur simultaneously in the medium. Such an index variation pattern, which is referred to as a volume grating, is often periodic. When the two waves propagate through the grating which they have induced, they are subjected to Bragg scattering, which causes one beam to scatter into the other and vice versa. Such scatterings are reminiscent of the read out process in holography.

The phenomenon of energy exchange between two electromagnetic waves in nonlinear media has been known for some time. Stimulated Brillouin scattering (SBS) and stimulated Raman scattering (SRS) are the best exapmples. Both of these processes require relatively high intensities for efficient coupling. Recent interest in two-beam coupling has focussed on the strong nonreciprocal energy exchange which occur at relatively lower intensities between two coherent laser beams in a class of materials called photorefractive crystals.

In applying the photorefractive two-beam coupling process to the present invention, it is important that the phases of the various spatial frequency components are preserved throughout the amplification process in order to maintain the integrity of the original image. Two-beam coupling in a photorefractive crystal in the diffusion regime provides this phase preserving feature and is thus used as the gain medium in the invention. The two-beam coupling process can be summarized as follows (a detailed analysis can be found in Yeh, Two-Wave Mixing in Nonlinear Media, IEEE Journal of Quantum Electronics, Volume 25, Pages 484–519 (1989)): The interaction between a pump beam and a probe beam with their amplitudes and phases given by $I_1 \psi_1$ and $I_2, \psi_2$, respectively, can be described by the following coupled equations:

$$\frac{d}{dz} I_1 = -\Gamma \frac{I_1 I_2}{I_1 + I_2} - \alpha I_1, \frac{d}{dz} I_2 = \Gamma \frac{I_1 I_2}{I_1 + I_2} - \alpha I_2 \quad 1)$$

$$\frac{d}{dz} \psi_1 = \beta \frac{I_2}{I_1 + I_2}, \frac{d}{dz} \psi_2 = \beta \frac{I_1}{I_1 + I_2} \quad 2)$$

where $\alpha$ is the (linear) bulk absorption coefficient, $\Gamma$ is the two-beam coupling constant, and $\beta$ is the phase coupling constant. The coupling coefficient $\Gamma$ is a function of the light induced space-charge electric field, the linear electro-optic coefficient, and other material parameters. Equations 1) can be solved to show that the probe beam can gain energy at the expense of the pump beam as the beams propagate along the crystal in the z-direction, which is a manifestation of the amplification process. More important, however, it can be shown that the phase coupling constant $\beta$ is zero for a photorefractive material whose charge transport mechanism is predominantly diffusion. In such a case, it is apparent from Equations 2) that there is no phase coupling between the two beams. Therefore, the amplitude of the probe beam can be increased significantly while its phase remains unchanged, regardless of the phase of the pump beam. The two-beam coupling process in $BaTiO_3$, for example, satisfies this requirement of amplification with no phase cross-talk without the application of an external electric field.

Figure 2A:
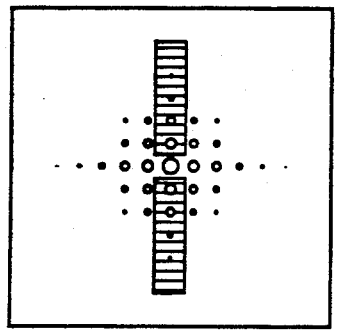
FIGS. 2A-E illustrate some of many possible enhancement arrangements for the optical image enhancer of FIG. 1.
Figure 2B:
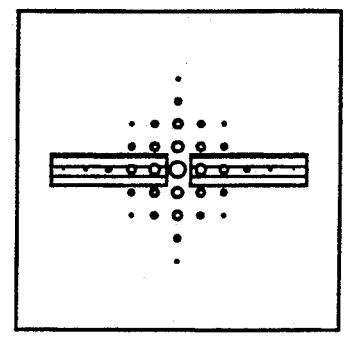

The type of enhancement obtained in the output image is determined according to the particular spatial frequency components which are selected to interact with the pump beam. FIGS. 2A-E, for example, illustrate some of many possible enhancement arrangements. These figures are two dimensional representations depicting the way in which the spatial frequency components of an image will be mapped at the Fourier plane. If the spatial frequency components indicated by the shaded regions in FIG. 2A, for example, are illuminated by the pump beam (as shown in FIG. 1), the horizontal edges in the image will be enhanced. The shading in FIG. 2B illustrates the spatial frequency components which should be illuminated in order to achieve vertical edge enhancement in the output image.

Figure 2C:
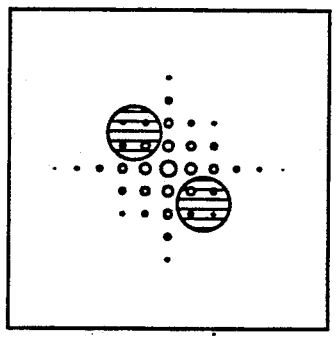
Figure 2D:
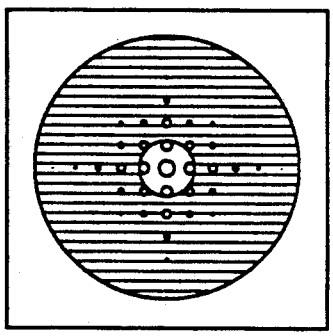
Figure 2E:
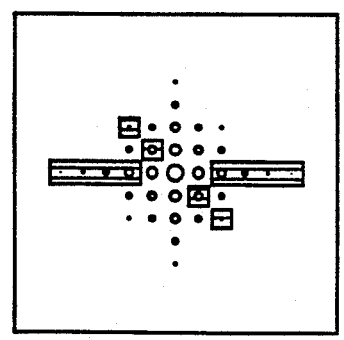

Selection of the spatial frequency components indicated by the shading in FIG. 2C will yield one type of diagonal edge enhancement, while illumination in the Fourier plane as depicted by the shading in FIG. 2D will result in the enhancement of all the edges in the output image. Finally, FIG. 2E demonstrates that virtually any arbitrary pattern of illumination of the Fourier plane by the probe beam may be used to achieve the enhancement of some portion or portions of the output image, which leads to the concept of matched amplification.

Figure 3:
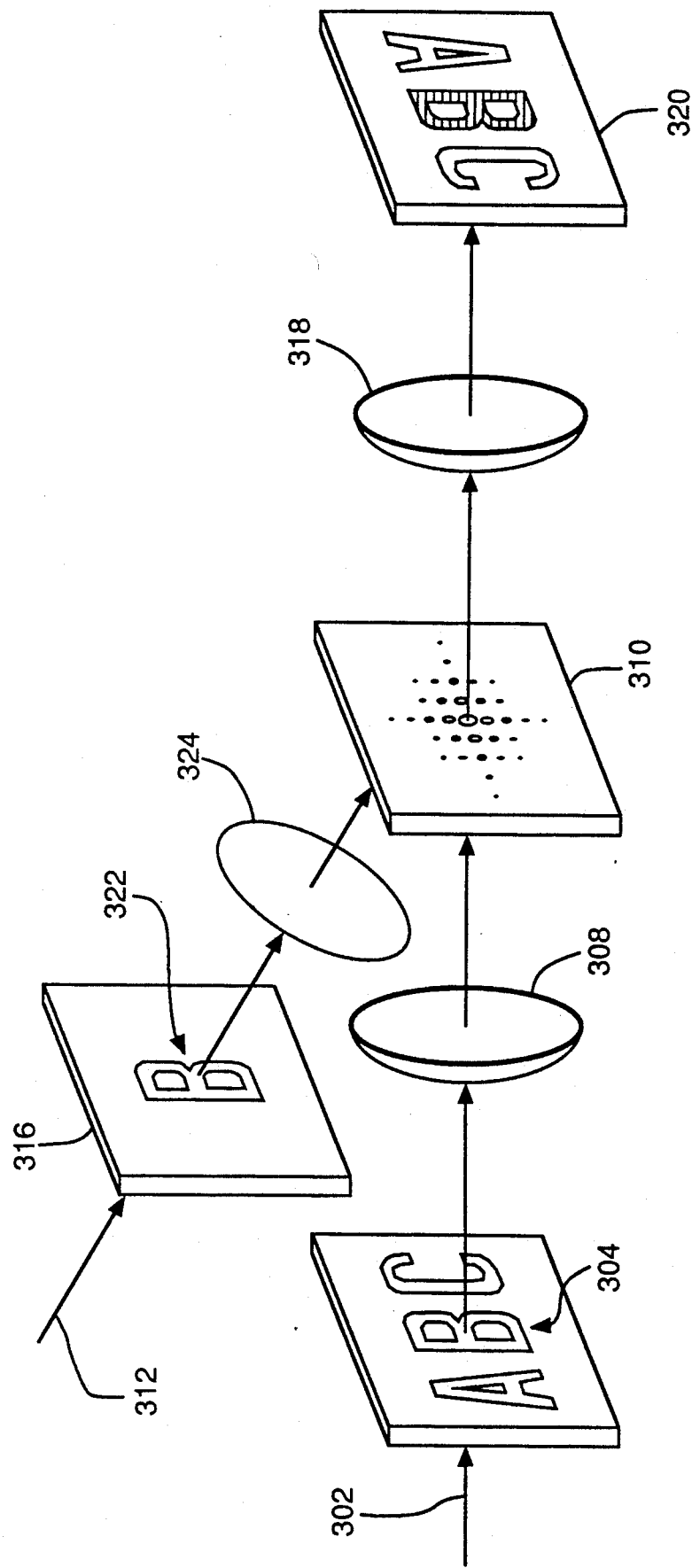
FIG. 3 is a schematic perspective view of an optical matched amplifier constructed according to this invention.

A particular type of spatial amplification, which may be designated as matched amplification, may also be achieved by this invention. Matched amplification is implemented by making the pump beam the Fourier transform of a reference image. Then, when the Fourier transform of the input image and the pump (reference) image interact in the nonlinear crystal, the objects in the input image which are similar to those in the pump beam image will be amplified to a greater extent and will be displayed brightly on the output plane. One embodiment of an optical matched amplifier constructed according to this invention, which is similar to the optical image enhancer of FIG. 1, is shown in a schematic perspective view in FIG. 3. A beam of coherent light 302 carries an input image 304 the imput image comprising for this example a representation of the letters "ABC". The image 304 is Fourier transformed by a lens 308 and directed into a photorefractive crystal 310. After traversing the crystal 310, the transformed image is Fourier transformed by a second lens 318 and reimaged at the output plane as an output image 320, as in the spatial amplifier of FIG. 1. In this matched amplifier embodiment, however, the pump beam, which is directed along the beam path 312, also contains an image. In this example the image 322 comprises the letter "B", which is imposed on the pump beam by a transparency or spatial light modulator 316. The image 322 on the pump beam is also Fourier transformed, by a third lens 324, and directed onto the crystal 310. If the transformed images from both lenses 308 and 324 are properly aligned and overlapped inside the crystal, the letter "B" from the original image 304 will be enhanced much more than the letters "A" and "C" by photorefractive two-beam coupling between the input beam and the pump beam in the crystal.

Another embodiment of the invention involves edge enhancement, which is used to reduce image cross-talk between the reference and background images in image recognition techniques. The present invention allows edge enhancement to be accomplished without losing a significant amount of energy from the incident image as a result of blocking the DC component. It is an outstanding feature of this invention to recover this normally lost energy by redirecting the DC component and mixing it with the higher order components in a photorefractive crystal. One embodiment in which this can be accomplished is illustrated in schematic form in FIG. 4. An incident polarized image 404 is Fourier transformed using a lens 408. A birefringent plate 426 is placed in the path of the transformed image in the Fourier plane. The birefringent plate contains a hole positioned such that the DC component of the Fourier transform, which is at the center of the beam path in the Fourier plane, passes through unaffected. The birefringent plate is cut such that the incident polarization of the remainder of the transformed image is rotated relative to the DC component by $\lambda/2$. The DC component 428 of the Fourier transform is then separated from the remainder of the signal 430 by a polarizing beamsplitter 432. Since the DC component contains much of the incident energy, it can be used to transfer energy to the higher order Fourier components by two-beam coupling in a photorefractive crystal 410. This is accomplished by directing the DC component through a half-wave plate 434, redirecting it by a mirror 436 through a lens 438 and then into the crystal 410. The remainder 430 of the beam is Fourier transformed by a lens 440 before it enters the crystal 410. Photorefractive two-beam coupling within the crystal 410 will yield an output image 420 (after reflection by a mirror 446 and focussing by a lens 448) which is an edge enhanced version of the incident image, while preserving most of the energy of the incident beam. To preserve the maximum amount of energy, the spatial overlap of the DC component (pump) and the higher order components (probe) in the photorefractive crystal should be optimized. This overlap will depend on the shape of the objects in the image. By making the pump beam cover most of the probe beam, one can efficiently transfer energy. In addition, mixing the beams at a plane other than the Fourier or image planes may increase the spatial overlap. Other problems such as matching the coherence length of the pump and probe beams must also be addressed.

Figure 4:
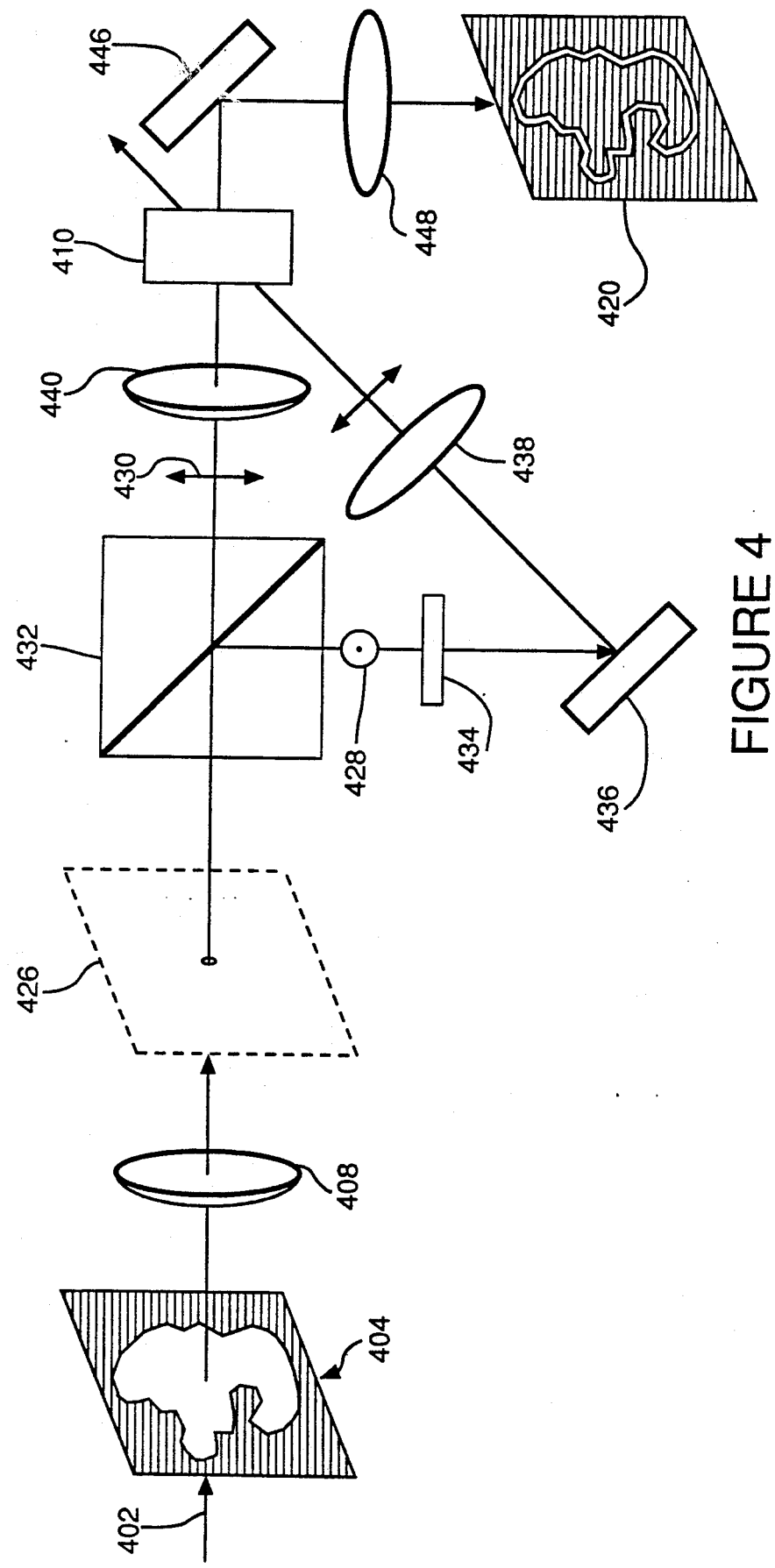
FIG. 4 is a schematic perspective view of an optical matched amplifier in which the DC component of the transformed image is mixed with the higher order components.
Figure 5:
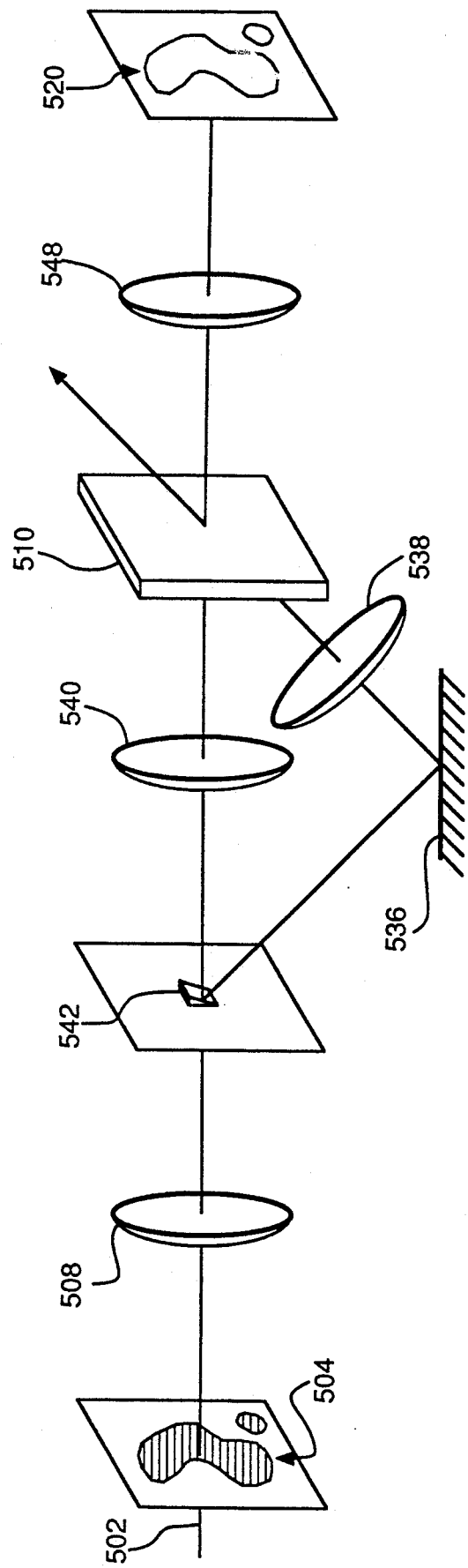
FIGS. 5 and 6 depict optical matched amplifiers similar to that in FIG. 4, but depict alternative approaches to separating the DC component.
Figure 6:
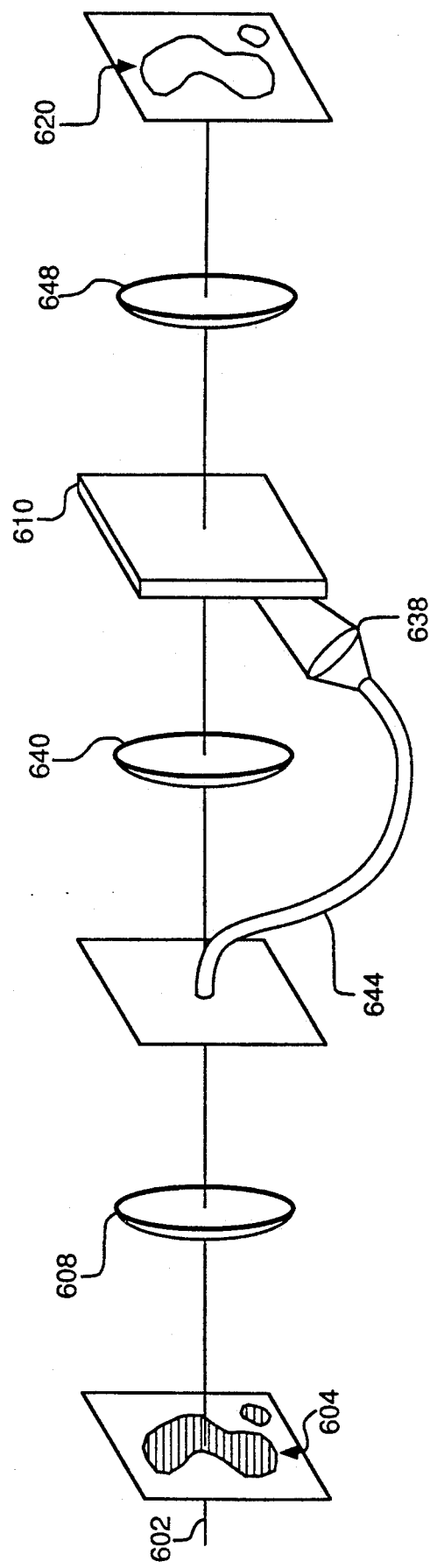

A number of ways may be envisioned to separate the DC component of the Fourier transform other than the birefringent plate shown in FIG. 4. Two alternatives are illustrated in FIGS. 5 and 6, which depict embodiments which are otherwise similar to that shown in FIG. 4. In the embodiment of FIG. 5, the DC component is intersected with a wedge prism 542 to deflect the DC portion of the beam. Another approach is to use a single-mode or multi-mode optical fiber 644 to redirect the DC component, as shown in FIG. 6.

The preferred embodiments of this invention have been illustrated and described above. Modifications and additional embodiments, however, will undoubtedly be apparent to those skilled in the art. In FIG. 4, for example, the birefringent plate could also be a small plate placed to rotate the polarization of only the DC component. Furthermore, it is not crucial that only the DC component be separated from the remainder of the signal; i.e., some of the lower order frequencies could be separated with the DC component. The matched amplifier, since it is an implementation of Fourier optics, also must contend with problems of scale and rotation invariance. Using the matched amplifier's ability to cascade multiple processing, however, it is conceivable that a translation and rotation invariant system could be implemented by cascading the translationally invariant transformation techniques with the rotationally invariant transformation techniques. In addition, it may be necessary to ensure the proper overlap of the pump and probe beams within the crystal, since the input and reference beams do not interact colinearly in the matched amplifier. This problem can be surmounted by arranging the two images to enter the crystal in counter-propagating directions. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference: Yeh, Two-Wave Mixing in Nonlinear Media, IEEE Journal of Quantum Electronics, Volume 25, Pages 484-519 (1989).

I claim:

1. An optical image enhancer, comprising:
   a beam of coherent light for carrying an input image;
   a first lens for receiving the beam and performing a spatial Fourier transform of the input image;
   a photorefractive crystal at the Fourier plane for receiving the transformed image;
   a coherent pump beam directed toward the Fourier plane;
   means for causing the coherent pump beam to illuminate selected spatial frequency components of the transformed image at the Fourier plane, thereby leaving a portion of the spatial frequency components unilluminated by the coherent pump beam and transferring energy only to the selected frequencies by two-beam coupling; and
   a second lens for receiving the transformed image from the Fourier plane and performing a spatial Fourier transform of the transformed image, thereby reproducing the input image in an output image which contains intensified features corresponding to the selected spatial frequency components.

2. The enhancer of claim 1, wherein the illuminated spatial frequency components are selected to increase the intensity of horizontal edges in the output image.

3. The enhancer of claim 1, wherein the illuminated spatial frequency components are selected to increase the intensity of vertical edges in the output image.

4. The enhancer of claim 1, wherein the illuminated spatial frequency components are selected to increase the intensity of diagonal edges in the output image.

5. The enhancer of claim 1, wherein the illuminated spatial frequency components are selected to increase the intensity of all the edges in the output image.

6. The enhancer of claim 1, wherein the means for causing the coherent pump beam to illuminate selected spatial frequency components of the transformed image at the Fourier plane further comprises a spatial light modulator.

7. The enhancer of claim 1, wherein the pump beam carries the Fourier transform of a selected portion of the input image, such that the intensity of the selected portion is increased in the output image.

8. The enhancer of claim 1, further comprising:
   an optical element between the first lens and the photorefractive crystal for separating the DC component of the transformed image from the remainder of the transformed image, such that the DC component of the transformed image is directed at the photorefractive crystal to act as the coherent beam and transfer energy to the higher order Fourier components of the transformed image.

9. The enhancer of claim 8, wherein the optical element further comprises:
   a birefringent plate for rotating the polarization of the DC component of the transformed image by 90°; and
   a polarizing beam splitter between the birefringent plate and the photorefractive crystal.

10. The enhancer of claim 8, wherein the optical element further comprises a prism.

11. The enhancer of claim 8, wherein the optical element further comprises an optical fiber.

12. An optical image enhancer, comprising:
    a beam of coherent light for carrying an input image;
    a first lens for receiving the beam and performing a spatial Fourier transform of the input image;
    a photorefractive crystal at the Fourier plane for receiving the transformed image;
    a coherent pump beam for carrying the Fourier transform of a selected portion of the imput image and illuminating the corresponding spatial frequency components of the transformed image a the Fourier plane, thereby transferring energy to the corresponding frequencies by two beam coupling; and
    a second lens for receiving the transformed image from the Fourier plane and performing a spatial Fourier transform of the transformed image, thereby reproducing the input image in an output image in which the intensity of the selected portion is increased.

13. An optical image enhancer, comprising:
    a beam of coherent light for carrying an input image;
    a first lens for receiving the beam and performing a spatial Fourier transform of the input image;
    an optical element at the Fourier plane for receiving the transformed image and separating the DC component of the transformed image from the remainder of the transformed image;
    a photorefractive crystal for receiving the transformed image, the DC component of the transformed image illuminating selected spatial frequency components of the transformed image at the Fourier plane, thereby transferring energy to the higher order Fourier components by two-beam coupling; and
    a second lens for receiving the transformed image from the crystal and performing a spatial Fourier transform of the transformed image, thereby reproducing the input image in an output image which contains intensified features corresponding to the selected spatial frequency components.

14. A method of enhancing an optical image, comprising the steps of:
    providing a beam of coherent light for carrying an input image;
    performing a spatial Fourier transform of the input image;
    directing the transformed image into a photorefractive crystal at the Fourier plane;
    directing a coherent pump beam toward the Fourier plane;
    causing the coherent pump beam to illuminate selected spatial frequency components of the transformed image in the crystal, thereby leaving a portion of the spatial frequency components unilluminated by the coherent pump beam and causing energy to transfer only to the selected frequencies by two-beam coupling; and
    performing a spatial Fourier transform of the transformed image, thereby reproducing the input image in an output image which contains intensified features corresponding to the selected spatial frequency components.

15. The method of claim 14, wherein the step of illuminating selected spatial frequency components further comprises illuminating selected frequencies to increase the intensity of horizontal edges in the output image.

16. The method of claim 14, wherein the step of illuminating selected spatial frequency components further comprises illuminating selected frequencies to increase the intensity of vertical edges in the output image.

17. The method of claim 14, wherein the step of illuminating selected spatial frequency components further comprises illuminating selected frequencies to increase the intensity of diagonal edges in the output image.

18. The method of claim 14, wherein the step of illuminating selected spatial frequency components further comprises illuminating selected frequencies to increase the intensity of all the edges in the output image.

19. The method of claim 14, wherein the step of illuminating selected spatial frequency components of the transformed image in the crystal with a coherent pump beam further comprises imposing the Fourier transform of a selected portion of the input image on the pump beam, thereby increasing the intensity of the selected portion in the output image.

20. The method of claim 14, further comprising the step of:
separating the DC component of the transformed image from the remainder of the transformed image, such that the DC component of the transformed image is directed at the photorefractive crystal to act as the coherent beam and transfer energy to the higher order Fourier components of the transformed image.

21. A method of enhancing an optical image, comprising the steps of:
providing a beam of coherent light for carrying an input image;
performing a spatial Fourier transform of the input image;
directing the transformed image into a photorefractive crystal at the Fourier plane;
illuminating the transformed image in the crystal with a coherent pump beam carrying the Fourier transform of a selected portion of the imput image, thereby transferring energy to the corresponding frequencies by two-beam coupling; and
performing a spatial Fourier transform of the transformed image, thereby reproducing the input image in an output image in which the intensity of the selected portion is increased.

22. A method of enhancing an optical image, comprising the steps of:
providing a beam of coherent light for carrying an input image;
performing a spatial Fourier transform of the input image;
separating the DC component of the transformed image from the remainder of the transformed image;
directing the remainder of the transformed image into a photorefractive crystal;
illuminating the transformed image in the crystal with the DC component of the transformed image, the DC component acting as a coherent pump beam to cause energy to transfer to the higher order Fourier components of the transformed image by two-beam coupling; and
performing a spatial Fourier transform of the transformed image, thereby reproducing the input image in an output image which contains intensified features corresponding to the selected spatial frequency components.

* * * * *